United States Patent
Schuster

(10) Patent No.: US 10,820,403 B2
(45) Date of Patent: *Oct. 27, 2020

(54) IRRADIATION TARGET FOR RADIOISOTOPE PRODUCTION, METHOD FOR PREPARING AND USE OF THE IRRADIATION TARGET

(71) Applicant: Framatome GmbH, Erlangen (DE)

(72) Inventor: Beatrice Schuster, Pfinztal (DE)

(73) Assignee: FRAMATOME GMBH, Erlangen (DE)

( * ) Notice: Subject to any disclaimer, the term of this patent is extended or adjusted under 35 U.S.C. 154(b) by 387 days.

This patent is subject to a terminal disclaimer.

(21) Appl. No.: 15/546,184

(22) PCT Filed: Jan. 19, 2016

(86) PCT No.: PCT/EP2016/050970
§ 371 (c)(1),
(2) Date: Jul. 25, 2017

(87) PCT Pub. No.: WO2016/120120
PCT Pub. Date: Aug. 4, 2016

(65) Prior Publication Data
US 2017/0365370 A1 Dec. 21, 2017

(30) Foreign Application Priority Data

Jan. 29, 2015 (WO) .................. PCT/EP2015/051842
Jan. 29, 2015 (WO) .................. PCT/EP2015/051844

(51) Int. Cl.
*H05H 6/00* (2006.01)
*G21G 1/02* (2006.01)
*C04B 35/50* (2006.01)

(52) U.S. Cl.
CPC .............. *H05H 6/00* (2013.01); *C04B 35/50* (2013.01); *G21G 1/02* (2013.01)

(58) Field of Classification Search
CPC ........ H05H 6/00; C04B 35/50; C04B 35/505; G21C 3/623
See application file for complete search history.

(56) References Cited

U.S. PATENT DOCUMENTS

| | | | | |
|---|---|---|---|---|
| 3,898,309 A * | 8/1975 | Pasto | ...... | C04B 35/50 264/0.5 |
| 3,905,845 A * | 9/1975 | Kobayashi | ............ | C04B 35/115 501/119 |
| 4,166,831 A * | 9/1979 | Rhodes | ...... | H01J 5/04 264/1.22 |
| 4,356,272 A * | 10/1982 | Kanemitsu | ............ | C04B 35/111 264/29.3 |
| 5,894,501 A * | 4/1999 | Doerr | ...... | G21C 3/623 252/636 |
| 8,288,736 B2 | 10/2012 | Amelia et al. | | |
| 8,679,998 B2 | 3/2014 | Watanabe et al. | | |
| 9,330,798 B2 | 5/2016 | Dayal et al. | | |
| 9,574,257 B2 | 2/2017 | Allenou et al. | | |
| 10,424,417 B2 * | 9/2019 | Schuster | ............. | G21G 1/02 |
| 2003/0183991 A1 | 10/2003 | Hideki et al. | | |
| 2004/0254418 A1 | 12/2004 | Munro et al. | | |
| 2007/0297554 A1 * | 12/2007 | Lavie | ............ | G21G 1/10 376/190 |
| 2008/0023645 A1 | 1/2008 | Amelia et al. | | |
| 2013/0170927 A1 | 7/2013 | Dayal et al. | | |
| 2013/0223578 A1 | 8/2013 | Russell, II et al. | | |
| 2013/0336833 A1 | 12/2013 | Allenou et al. | | |

FOREIGN PATENT DOCUMENTS

| | | |
|---|---|---|
| CA | 2631712 C | 4/2014 |
| CN | 1341761 A | 3/2002 |
| CN | 1922695 A | 2/2007 |
| CN | 101515483 A | 8/2009 |
| CN | 101628811 A | 1/2010 |
| CN | 103608481 A | 2/2014 |
| EP | 1336596 B1 | 8/2003 |
| EP | 2093773 A2 | 8/2009 |
| RU | 2241266 C1 | 11/2004 |

OTHER PUBLICATIONS

PCT International Search Report and Written Opinion dated Apr. 18, 2016 from corresponding Application No. PCT/EP2016/050970, 10 pages.
International Search Report issued in PCT International Application No. PCT/EP2015/051842 dated Oct. 12, 2015.
International Search Report issued in PCT International Application No. PCT/EP2015/051844 dated Sep. 29, 2015.

* cited by examiner

Primary Examiner — Sharon M Davis
(74) Attorney, Agent, or Firm — Dilworth IP, LLC

(57) ABSTRACT

The invention provides a sintered rare earth metal oxide target for producing a radioisotope in an instrumentation tube of a nuclear power reactor, wherein the sintered target has a density of at least 90 percent of the theoretical density, and wherein the sintered target contains chromium in an amount of from 500 to 2000 µg/g, and Mg and/or Ca in an amount of from 1000 to 6000 µg/g. The sintered target is prepared by providing a rare earth metal oxide powder, blending the rare earth metal oxide powder with chromium oxide, dry granulating and consolidating the powder in a mold to form a spheroidal green body, and sintering the green body in solid phase to form a spheroidal ytterbia target.

23 Claims, No Drawings

IRRADIATION TARGET FOR RADIOISOTOPE PRODUCTION, METHOD FOR PREPARING AND USE OF THE IRRADIATION TARGET

TECHNICAL FIELD OF THE INVENTION

The present invention is directed to an irradiation target used to produce radioisotopes in an instrumentation tube of a commercial nuclear power reactor, and a method for preparing the irradiation target.

BACKGROUND OF THE INVENTION

Radioisotopes find applications in various fields such as industry, research, agriculture and medicine. Artificial radioisotopes are typically produced by exposing a suitable target material to neutron flux in a cyclotron or in a nuclear research reactor for an appropriate time. Irradiation sites in nuclear research reactors are expensive and will become even scarcer in future due to the age-related shut-down of research reactors.

EP 2 093 773 A2 is directed to a method and a system of producing radioisotopes using the instrumentation tubes of a commercial nuclear power reactor, the method comprising: choosing at least one irradiation target with a known neutron cross-section; inserting the irradiation target into an instrumentation tube of a nuclear reactor, the instrumentation tube extending into the reactor to expose the irradiation target to neutron flux encountered in the nuclear reactor when operating, the irradiation target substantially converting to a radioisotope when exposed to a neutron flux encountered in the nuclear reactor.

The radioisotope generation system disclosed in EP 2 093 773 A2 includes additional subsystems such as an irradiation target drive subsystem, an irradiation target storage and an insertion/removal subsystem that have to fit into the remaining available space of an already build commercial nuclear power reactor. The irradiation target drive subsystem is mechanical and comprises driving gears for positioning the irradiation target at an axial position in the instrumentation tube for an amount of time corresponding to an amount of time required to convert substantially all the irradiation target to a radioisotope at a flux level corresponding to the axial position based on an axial neutron flux profile of the operating nuclear reactor; and removing the irradiation target and produced radioisotope from the instrumentation tube. The roughly spherical irradiation targets may be generally hollow and include a liquid, gaseous and/or solid material that converts to a useful gaseous, liquid and/or solid radioisotope. The shell surrounding the target material may have negligible physical changes when exposed to a neutron flux. Alternatively, the irradiation targets may be generally solid and fabricated from a material that converts to a useful radioisotope when exposed to neutron flux present in an operating commercial nuclear reactor.

The radioisotope generation method and system disclosed in EP 2 093 773 A2 may provide a complementary source of radioisotopes by activating irradiation targets using the instrumentation tubes of a commercial nuclear power reactor. However, the method and system are still economically not optimal and technically difficult to implement because they require additional main mechanical subsystems that need to be installed into an already existing commercial nuclear power reactor, and the production costs of the spherical irradiation targets are not economically sustainable.

EP1 336 596 B1 discloses a transparent sintered rare earth metal oxide body represented by the general formula $R_2O_3$ wherein R is at least one element of a group comprising Y, Dy, Ho, Er, Tm, Yb and Lu. The sintered body is prepared by providing a mixture of a binder and a high-purity rare earth metal oxide material powder having a purity of 99.9% or more, and having an Al content of 5-100 wtppm in metal weight and an Si content of 10 wt-ppm or less in metal weight, to prepare a molding body having a green density of 58% or more of the theoretical density. The binder is eliminated by thermal treatment, and the molding body is sintered in an hydrogen or inert gas atmosphere or in a vacuum at a temperature of between 1450° C. and 1700° C. for 0.5 hour or more. The addition of Al serves as a sintering aid and is carefully controlled so that the sintered body has a mean grain size of between 2 and 20 μm.

U.S. Pat. No. 8,679,998 B2 discloses a corrosion-resistant member for use in a semiconductor manufacturing apparatus. An $Yb_2O_3$ raw material having a purity of at least 99.9% is subjected to uniaxial pressure forming at a pressure of 200 $kgf/cm^2$ (19.6 MPa), so as to obtain a disc-shaped compact having a diameter of about 35 mm and a thickness of about 10 mm. The compact is placed into a graphite mold for firing. Firing is performed using a hot-press method at a temperature of 1800° C. under an argon atmosphere for at least 4 hours to obtain a corrosion-resistant member for semiconductor manufacturing apparatus. The pressure during firing is 200 $kgf/cm^2$ (19.6 MPa). The $Yb_2O_3$ sintered body has an open porosity of 0.2%.

US 2004/254418 A1 discloses a Yb-169 radioactive source encased in a biocompatible capsule for treating a tumor or cancerous area. The source is produced from ytterbium which is substantially enriched in Yb-168 and which is activated by exposure to neutron flux so as to contain a significant fraction of Yb-169. The Yb radioactive source comprises powdered ytterbium or ytterbium oxide pressed into a solid form to form a pellet having a volume less than 2 $mm^3$. The powdered ytterbium oxide may be formed into a pellet by sintering or hot isostatic pressing. The pellet may further include one or more materials selected from aluminum, copper, vanadium, nickel, iron, titanium, silicon, carbon, oxygen, and alloys and compounds of the above combined with the ytterbium by mixing, compounding, or alloying.

The above methods generally provide sintered rare earth metal oxide bodies adapted to specific applications such as corrosion-resistance, optical transparency or encapsulated radioactive brachytherapy sources. However, none of the sintered bodies produced by these methods have properties required for irradiation targets which are to be used for production of radioisotopes in an instrumentation tube system of a commercial nuclear power reactor.

SUMMARY OF THE INVENTION

It would be desirable to have a solution that overcomes the above problems by providing a radioisotope generation system based on a safer driving solution for the irradiated target that moreover can be implemented from minor modifications on safety proven existing measurement systems already embedded in some commercial nuclear power reactors.

It is an object of the present invention to provide appropriate targets which can be used as precursors for the production of predetermined radioisotopes by exposure to the neutron flux in a commercial nuclear power reactor, and which at the same time have mechanical features able to withstand the specific conditions in a pneumatically operated radioisotope generating system.

It is a further object of the invention to provide a method for the production of these irradiation targets which is cost effective and suitable for mass production.

According to the invention, this object is solved by an irradiation target of claim 1, and a method for the production of irradiation targets according to claim 13.

Preferred embodiments of the invention are given in the sub-claims, which may be freely combined with each other.

The irradiation targets of the present invention have small dimensions adapted for use in commercially existing ball measuring systems, and also fulfill the requirements with respect to pressure resistance, temperature resistance and shear resistance so that they are sufficiently stable when being inserted in a ball measuring system and transported through the reactor core by means of pressurized air. In addition, the targets can be provided with a smooth surface to avoid abrasion of the instrumentation tubes. Moreover, the irradiation targets have a chemical purity which makes them useful for radioisotope production.

DETAILED DESCRIPTION OF THE INVENTION

In a first aspect, the invention is directed to sintered rare earth metal oxide target for use in a pneumatically driven radioisotope generation system wherein the target is irradiated in an instrumentation tube of a nuclear power reactor in operation, characterized in that the sintered target has mechanical features and chemical features for mechanical integrity resistance to mechanical constraints and impacts resulting from pneumatic drive during insertion in the instrumentation tube, irradiation and retrieving from the instrumentation tube after irradiation.

Accordingly, the inventive target is intended for use in a system for generating radioisotopes in an operating nuclear reactor vessel comprising an irradiation target drive subsystem having means to produce a pressurized gaseous fluid that interacts with the irradiation targets to drive them from a target storage subsystem into the instrumentation tube, and from the instrumentation tube into a removal subsystem after irradiation.

Preferably, the sintered rare earth metal target contains chromium in an amount of from 500 to 2000 µg/g, and Mg and/or Ca in an amount of from 1000 to 6000 µg/g.

Still preferably, the sintered rare earth metal target contains aluminum in an amount of between 500 and 8000 µg/g, preferably 500 to 6000 µg/g.

In a preferred embodiment, the sintered rare earth metal target consists of a rare earth metal oxide represented by the general formula $R_2O_3$ wherein R is a rare earth metal selected from the group consisting of Nd, Sm, Y, Dy, Ho, Er, Tm, Yb and Lu, preferably Sm, Y, Ho or Yb, wherein the rare earth metal oxide is doped with chromium in an amount of from 1000 to 6000 µg/g, Mg and/or Ca in an amount of from 1000 to 6000 µg/g, and contains aluminum in an amount of between 500 and 8000 µg/g, and unavoidable impurities.

In a further aspect, the invention is directed to a sintered rare earth metal oxide target for producing a radioisotope in an instrumentation tube of a nuclear power reactor, wherein the sintered target has a density of at least 90 percent of the theoretical density, and wherein the sintered target contains chromium in an amount of from 500 to 2000 µg/g, and Mg and/or Ca in an amount of from 1000 to 6000 µg/g.

The inventors surprisingly found that use of chromium as a sintering aid in controlled amounts provides sufficient mechanical stability to the sintered rare earth metal oxide targets so that the targets are able to withstand the severe conditions in the core of a commercial nuclear reactor and during transport through the instrumentation tubes of a ball measuring system or incore probe measuring system. Although not wishing to be bound by theory, the inventors contemplate that an addition of chromium to the rare earth metal oxide, together with small amounts of magnesium and/or calcium, may increase the grain size of the rare earth metal oxide during sintering and reduce open porosity. Other sintering aids such as alumina may also result in a high sintering density, but have been proven to be insufficient in terms of mechanical stability of the sintered rare earth metal oxide targets. Therefore, while small amounts of these other sintering aids may also be present, the addition of a controlled amount of chromium is required to impart mechanical stability to the sintered rare earth metal oxide targets.

According to a preferred embodiment of the sintered target, the rare earth metal oxide is represented by the general formula $R_2O_3$ wherein R is a rare earth metal selected from the group consisting of Nd, Sm, Y, Dy, Ho, Er, Tm, Yb and Lu.

More preferably, the rare earth metal R in the rare earth metal oxide $R_2O_3$ is Sm, Y, Ho, or Yb, preferably Yb-176 which is useful for producing Lu-177, or Yb-168 which can be used to produce Yb-169.

Most preferably, the rare earth metal in the rare earth metal oxide is monoisotopic. This guarantees a high yield of the desired radioisotope and reduces purification efforts and costs.

In a preferred embodiment, the sintered target contains Mg in an amount of between 1000 and 6000 µg/g. Calcium may be used to replace magnesium in part or total. Calcium and Magnesium have been found effective to increase the grain size of the sintered rare earth metal oxide targets. However, if the amount of Ca and/or Mg exceeds 6000 µg/g, the mechanical strengths of the sintered targets may decrease. Further, it was found that use of Ca and/or Mg alone does not result in sintered targets having sufficient mechanical stability for use in an instrumentation tube system of a commercial reactor.

Aluminum compounds may also serve as a sintering aid in the sintering of rare earth metal oxides, and may form mixed oxide phases depositing at the grain boundaries of the sintered rare earth metal oxide. The presence of small amounts of these mixed oxide phases may also increase the mechanical strength of the sintered targets.

Preferably, the sintered target contains aluminum in an amount of between 500 and 8000 µg/g, based on the weight of the sintered rare earth metal oxide target, preferably 6000 µg/g or less. An aluminum metal content of more than 8000 µg/g may interfere with the mechanical stability of the sintered targets and/or their further use for radioisotope production.

Most preferably, the sintered target consists of the rare earth metal oxide, chromium in an amount of from 500 to 2000 µg/g, Mg and/or Ca in an amount of from 1000 to 6000 µg/g, and optionally aluminum in an amount of 500 and 8000 µg/g, apart from unavoidable impurities.

Preferably, the sintered target has a density of at least 92 percent of the theoretical density. Still preferably, the sintering density may range from 92% to 98% of the theoretical density, more preferably from 92% to 95%. Higher sintering densities would require more severe sintering conditions and are therefore less preferred. The sintering density can be determined by hydrostatic measurement.

In a further embodiment, the sintered target has a porosity of less than 10%, preferably less than 5%. Controlling the porosity in a range of up to 10%, preferably up to 5% increases the mechanical impact resistance of the sintered targets.

Preferably, the maximum size of the pores is less than 100 µm, more preferably less than 80 µm, and most preferably less than 70 µm.

The average grain size of the sintered target preferably is 35 µm or more, most preferably 40 µm or more. Still preferably, the average grain size may range from 35 µm to about 80 µm. Individual grains of the sintered rare earth metal oxide may have a grain size of up to 250 µm, preferably up to 300 µm. The inventors found that a grain size in the given range is preferable to provide the sintered target with the sufficient hardness and mechanical strength to withstand impact conditions in pneumatically operated ball measuring systems.

The sintered target may have any shape making it useful for being inserted into and transported through an instrumentation tube used in a commercial nuclear reactor. Preferably, the sintered target has a round or spheroidal shape, more preferably a spherical shape.

Preferably, the sintered target has a diameter in a range of from 1 to 5 mm, preferably 1 to 3 mm. It is understood that sintering involves a shrinkage in the order up to 30%. Thus, the dimensions of the green body are chosen so that shrinkage during sintering results in sintered targets having a predetermined diameter for insertion into commercial ball measuring systems.

Preferably, the targets according to the present invention are resistant to a pneumatic inlet pressure of 10 bar used in commercial ball measuring systems and/or an impact velocity of 10 m/s. In addition, as the targets have been subjected to high sintering temperatures, it is understood that the sintered targets are capable to withstand processing temperatures in the order of about 400° C. present in the core of an operating commercial nuclear reactor.

In a further aspect of the invention, a method of preparing an irradiation target for radioisotope production in an instrumentation tube of a nuclear power reactor, comprises the steps of:

Providing a powder blend comprising a rare earth metal oxide, chromium oxide and a binder wherein chromium oxide is present in the powder blend in an amount of from 1000 to 3000 µg/g;

Pre-consolidating the powder blend to form granules having a grain size of less than 500 µm, and consolidating the granulated powder blend to form a green body; or Pelletizing the powder blend by agglomeration in a rotating drum or on a rotating disc to form a green body; and Placing the green body on a support comprising Mg and/or Ca and sintering at a temperature of at least 1700° C. to form a sintered rare earth oxide target having a sintered density of at least 90% of the theoretical density.

The invention resorts to processes known from the manufacture of sintered ceramics and dry granulation or powder agglomeration techniques, and can therefore be carried out on commercially available equipment, including appropriate molds, presses and sintering facilities. Dry granulation and press molding also allows for providing the targets with various shapes, including round or spheroidal shapes and dimensions, which facilitate use in existing instrumentation tubes for ball measuring systems. Thus, the costs for preparing the irradiation targets can be kept low since mass production of suitable radioisotope precursor targets will be possible. The method is also variable and useful for producing many different targets having the required chemical purity. In addition, the sintered targets are found to be mechanically stable and in particular resistant to transportation within instrumentation tubes using pressurized air even at temperatures of up to 400° C. present in the nuclear reactor core.

According to a preferred embodiment, the rare earth metal oxide in the powder blend is represented by the general formula $R_2O_3$ wherein R is a rare earth metal selected from the group consisting of Nd, Sm, Y, Dy, Ho, Er, Tm, Yb and Lu.

Preferably, the powder of the rare earth metal oxide has a purity of greater than 99%, more preferably greater than 99.9%/TREO (TREO=Total Rare Earth Oxide), or even greater than 99.99%. The inventors contemplate that an absence of neutron capturing impurities such as B, Cd, Gd is beneficial to the further use of the sintered target as a radioisotope precursor.

Most preferably, the powder of the rare earth metal oxide is ytterbium oxide enriched of Yb-176 with a degree of enrichment of >99%.

The rare earth metal oxide in the powder blend may have an average grain size in the range of between 5 and 50 µm. The grain size distribution preferably is from d50=10 µm and d100=30 µm to d50=25 µm and d100=50 µm. Compactable rare earth metal oxide powders are commercially available from ITM Isotopen Technologie München AG.

The amount of chromium oxide in the powder blend is carefully controlled to be in a range of from 1000 to 3000 µg/g, based on the weight of the rare earth metal oxide. An amount of less than 1000 µg/g of chromium oxide does not substantially increase the mechanical stability of the sintered rare earth metal oxide targets. Use of chromium oxide in an amount of more than 3000 µg/g does not show any further beneficial effect.

The binder in the powder blend may be any compound known as a lubricant in the processing of ceramic powders for sintering. Preferably, the binder is a metal salt of a fatty acid, more preferably an aluminum or calcium salt of a fatty acid, still more preferably an aluminum stearate, and most preferably aluminum distearate.

More preferably, the binder is added to the powder in an amount of between 0.01 to 0.1 weight percent, preferably 0.02 to 0.07 weight percent.

Most preferably, the powder blend consists of the rare earth metal oxide, chromium oxide and binder, apart from unavoidable impurities.

For preparing green bodies of the sintered targets, the powder blend is preferably subjected to a dry granulation press. The primary powder particles can be aggregated under high pressure using swaying or high shear mixer-granulators. Preferably, pre-consolidation of the powder blend is carried out using a heavy duty tablet press at a pressing force in a range between 10 and 50 kN, preferably 25 to 35 kN to form a large tablet or slug, or using a roller compactor for squeezing the powder blend between two rollers to produce a ribbon or pellets.

The pre-consolidated slug or pellets are then milled through a low-shear mill and passed through a sieve to form granules having a grain size of less than 500 µm, preferably less than 450 µm. If the grain size of the granules exceeds 500 µm, further consolidation of the granules may be difficult to achieve.

Preferably, further binder is added to the pre-consolidated granules in an amount of between 5 and 10 weight percent, preferably 5 to 7 weight percent.

If the binder contains calcium, magnesium or aluminum, the total amount of binder used in the granulation process is controlled to not exceeding an amount of 6000 µg/g Ca and/or Mg, and/or an amount of 8000 µg/g Al, based on the total weight of the sintered rare earth metal oxide target.

The pre-consolidated granules are then consolidated by press molding to form green bodies of the sintered rare earth metal oxide targets. Preferably, the green bodies have a round or spheroidal shape, more preferably a spherical shape. The term "spheroidal" means that the body is capable of rolling, but does not necessarily have the form of a perfect sphere.

Press molding of the pre-consolidated granules can carried out preferably by hydraulic pressing at a pressing force in a range from 0.1 to 10 kN, preferably from 0.5 to 2 kN, using commercially available equipment which is known to a person skilled in the art.

The mold may be made of hardened steel so as to avoid an uptake of impurities from the mold material during consolidation of the green body.

Preferably, the green density of the green body after molding is up to 65 percent of the theoretical density, and more preferably in a range of from 55 to 65 percent of the theoretical density. The high green density facilitates automated processing of the consolidated green body.

Optionally, the round or spheroidal green body may be polished to improve its sphericity or roundness.

In an alternative method, the round or spheroidal green bodies may be formed by powder agglomeration. Powder agglomeration techniques are known to a person skilled in the art for producing compacted spherical bodies. The review article of N. Clausen, G. Petzow, "Kugelherstellung durch Pulveragglomeration", Z. f. Werkstofftechnik 3 (1973), pp. 148-156, discloses standard agglomeration methods and the relevant physical parameters. A rotating drum for powder agglomeration is disclosed, for example, in EP 0 887 102 A2.

Preferably, the powder blend comprising or consisting of the rare earth metal oxide, chromium oxide and binder is pelletized by agglomerating in a rotating drum or on a pelletizing disc.

More preferably, the binder is added to the oxide powder blend during the pelletizing step, preferably by spraying an aqueous solution or suspension of the binder onto the powder. It is also possible to provide the powder blend including the binder, and subject the powder blend to pelletizing by agglomeration in a rotating drum or on a pelletizing disc.

The pelletized green bodies preferably have a green density of at least 30 percent of the theoretical density, more preferably at least 40 percent and still more preferably in a range of from 30 to 50 percent of the theoretical density. The green density is sufficient to facilitate automated processing of the pelletized green body.

In the sintering step, the green body is preferably kept at a sintering temperature of between 70 and 80 percent of the solidus temperature of the rare earth metal oxide. More preferably, the sintering temperature is in a range of between 1700 and 1850° C., still more preferably between 1750 and 1850° C. The inventors found that a sintering temperature in this range is suitable for sintering most rare earth metal oxides to a high sintering density of at least 90 percent of the theoretical density.

Preferably, the green body is kept at the sintering temperature and sintered for a time of from 4 to 24 hours, preferably under atmospheric pressure.

According to a preferred embodiment, the green body is sintered in a reducing atmosphere comprising a mixture of hydrogen and an inert gas such as nitrogen and/or argon.

While less preferred, the green body may also be sintered in an oxidizing atmosphere comprising a mixture of oxygen and an inert gas such as nitrogen and/or argon.

Prior to sintering, the green body may be subjected to degreasing by heating the green body to a temperature in a range of from 400 to 700° C., for 0.5 to 1 hours.

Preferably, the green body is placed on a support comprising or consisting of MgO and/or CaO, preferably MgO, during sintering and optionally degreasing of the green body. Small amounts of MgO and CaO are then taken up while the green body is sintered to form mixed oxide phases deposited at the grain boundaries of the rare earth metal oxide. The mixed oxide phases may assist grain growth and increase the mechanical strength of the sintered targets.

Optionally, the sintered rare earth metal oxide target may be polished or ground to remove superficial residues and improve its surface roughness. This post-sintering treatment may reduce abrasion of the instrumentation tubes by the sintered targets when inserted at high pressure.

According to a further aspect of the invention, the sintered rare earth metal oxide targets are used for producing one or more radioisotopes in an instrumentation tube of a nuclear power reactor when in energy producing operation. In a method of producing the radioisotopes, the sintered targets are inserted in an instrumentation tube extending into the reactor core by means of pressurized air, preferably at a pressure of about 7 to 30 bar, and are exposed to neutron flux encountered in the nuclear reactor when operating, for a predetermined period of time, so that the sintered target substantially converts to a radioisotope, and removing the sintered target and produced radioisotope from the instrumentation tube.

A system for generating radioisotopes in an operating nuclear reactor vessel comprising an irradiation target drive subsystem having means to produce a pressurized gaseous fluid that interacts with the sintered irradiation targets to drive them from a target storage subsystem into the instrumentation tube, and from the instrumentation tube into a removal subsystem after irradiation. Preferably, the rare earth metal oxide is ytterbia-176 and the desired radioisotope is Lu-177. After exposure to the neutron flux the sintered targets are dissolved in acid and the Lu-177 is extracted, for example as disclosed in European Patent EP 2 546 839 A1 which is incorporated herein by reference. Lu-177 is a radioisotope having specific applications in cancer therapy and medical imaging.

The construction and method of operation of the invention, together with additional objects and advantages thereof, will be best understood from the following description of specific embodiments.

Preparation of Sintered Ytterbia Targets

A sintered ytterbia target was produced by providing an ytterbia powder, blending the ytterbia powder with chromium oxide, dry granulating and consolidating the powder in a mold to form a spherical green body, and sintering the green body in solid phase to form a spherical ytterbia target.

The starting ytterbia powder was monoisotopic Yb-176 oxide and had a purity of greater than 99%/TREO, with the following specification being used:

| | |
|---|---|
| Yb₂O₃/TREO (% min.) | 99.9 |
| TREO (% min.) | 99 |
| Loss On Ignition (% max.) | 1 |
| Rare Earth Impurities | % max. |
| Tb₄O₇/TREO | 0.001 |
| Dy₂O₃/TREO | 0.001 |
| Ho₂O₃/TREO | 0.001 |
| Er₂O₃/TREO | 0.01 |
| Tm₂O₃/TREO | 0.01 |
| Lu₂O₃/TREO | 0.001 |
| Y₂O₃/TREO | 0.001 |
| Non-Rare Earth Impurities | % max. |
| Fe₂O₃ | 0.001 |
| SiO₂ | 0.01 |
| CaO | 0.01 |
| Cl⁻ | 0.03 |
| NiO | 0.001 |
| ZnO | 0.001 |
| PbO | 0.001 |

2 g of the ytterbia powder were blended with 3 µg chromium oxide and 0.1 g aluminum distearate. Optical analysis showed that the ytterbia powder had an average grain size of about 10 µm.

The powder blend was thoroughly mixed and pre-consolidated in a tablet press using a pressing force of 30 kN to form pre-consolidated slugs or pellets. The slugs were milled and sieved to form granules having a maximum particle size of 425 µm. The granules were blended with 0.13 g of aluminum distearate as a lubricant or binder, and compression molded to form spherical green bodies using a pressing force of 1 kN.

The spherical green bodies were placed on a support made of magnesium oxide and subjected to a degreasing step for removing organic binder components by keeping the green bodies at 500° C. for 0.5 hours. Thereafter, the green bodies were heated to a sintering temperature of 1760° C. at a heating rate of 5K/min, and kept at the sintering temperature for 6 hours under atmospheric pressure using a sintering atmosphere consisting of argon and hydrogen.

Analysis of the Sintered Ytterbia Targets

The ytterbia targets obtained by the above process had a spherical shape and an average diameter of about 1.7 mm as measured using a micrometer screw gauge.

The density of the ytterbia targets was 8.594 g/cm³ as measured by hydrostatic weighing. Therefore, the ytterbia targets had a sintering density of 93.72% of the theoretical density.

Further, one of the sintered spherical ytterbia targets was ground down to the center of the target and analyzed by optical microscopy at 50-fold and 100-fold magnification. Software-assisted evaluation of the micrographs showed that the maximum pore size was 67 µm, and that the total porosity was 4.4%. The average grain size of the sintered ytterbia was about 40 µm.

The metal content of the sintered ytterbia was measured by inductively coupled plasma mass spectrometry (ICP-MS). The ytterbia targets had a chromium content of 1040 µg/g (ppm), an aluminum content of 5730 g/g, and a magnesium content 4380 µg/g, each referring to the metal atom content.

Stability Tests

Conditions in the reactor core of a commercial nuclear reactor include high pressure and temperatures above 300° C. Moreover, the sintered ytterbia targets must be able to withstand transport conditions in the instrumentation tubes of the nuclear reactor. Conservative calculations show that inserting the sintered targets in the instrumentation tube, transporting the targets to the nuclear reactor core and harvesting the irradiated targets from the instrumentation tubes will involve at least four impacts at a transporting pressure of 10 bar and/or an impact velocity of 10 m/s.

25 sintered ytterbia targets were inserted into a laboratory scale ball measuring system of a nuclear reactor, and shot five times through the system using pressurized air at a pressure of 10 bar thereby creating a total of ten impacts. The targets were then visually inspected to determine any damages. Thereafter, the sintered targets were stored at 350° C. for two weeks, and again subjected to a transport through the ball measuring system thereby creating another two impacts.

All of the sintered ytterbia targets survived the stability test without any damage.

Ytterbia-176 is considered to be useful for producing the radioisotope Lu-177 which has applications in medical imaging and cancer therapy, but which cannot be stored over a long period of time due to its short half-life of about 6.7 days. Yb-176 is converted into Lu-177 according to the following reaction:

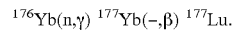

$$^{176}Yb(n,\gamma) \, ^{177}Yb(-,\beta) \, ^{177}Lu.$$

The test results indicate that the sintered ytterbia targets obtained by the method of the present invention are useful precursors for the production of Lu-177 in the instrumentation tubes of a nuclear reactor during energy producing operation.

Similar reactions are known to the person skilled in the art for the production of other radioisotopes from various rare earth oxide precursors.

The invention claimed is:

1. A sintered rare earth metal oxide target for producing a radioisotope in an instrumentation tube of a nuclear power reactor, consisting of the rare earth metal oxide doped with chromium in an amount of from 500 to 2000 µg/g, Mg and/or Ca in an amount of from 1000 to 6000 µg/g, aluminum in an amount of between 500 and 8000 µg/g, and unavoidable impurities, wherein the rare earth metal oxide is represented by the general formula R₂O₃ wherein R is Yb.

2. The target according to claim 1, having a density of at least 90 percent of the theoretical density.

3. The target according to claim 1, wherein the rare earth metal is monoisotopic.

4. The target according to claim 1, wherein the Mg is present in an amount of between 1000 and 6000 µg/g.

5. The target according to claim 1, having a density of at least 92 percent of the theoretical density.

6. The target according to claim 1, having a porosity of less than 10%.

7. The target according to claim 1, comprising pores having a size less than 100 µm.

8. The target according to claim 1, having an average grain size of 35 µm or more.

9. The target according to claim 1, wherein the target is spheroidal and has a diameter in a range of from 1 to 5 mm.

10. The target according to claim 1, wherein the target is resistant to a pneumatic transport pressure of 10 bar and/or an impact velocity of 10 m/s.

11. A method for preparing an irradiation target according to claim 1, comprising the steps of:
providing a powder blend consisting of a rare earth metal oxide, chromium oxide, aluminum distearate and a binder wherein chromium oxide is present in the powder blend in an amount of from 1000 to 3000 µg/g, and the rare earth metal is ytterbium;

pre-consolidating the powder blend to form granules having a grain size of less than 500 µm, and consolidating the granulated powder blend to form a green body; or pelletizing the powder blend by agglomeration in a rotating drum or on a rotating disc to form a green body; and placing the green body on a support comprising Mg and/or Ca and sintering at a temperature of at least 1700° C. to form a sintered rare earth oxide target having a sintered density of at least 90% of the theoretical density.

12. The method according to claim 11, wherein the powder of the rare earth metal oxide has a purity of greater than 99%.

13. The method according to claim 11 wherein the binder is a metal salt of a fatty acid.

14. The method according to claim 11, wherein the binder is added to the powder blend in an amount of between 0.01 to 0.1 weight percent.

15. The method according to claim 11, wherein the powder blend is pre-consolidated using a pressing force in a range between 10 and 50 kN to form a pre-consolidated slug or pellet.

16. The method according to claim 15, wherein the pre-consolidated slug or pellet is milled and sieved to form the granules.

17. The method according to claim 11, wherein further binder is added to the granules in an amount of between 5 and 10 weight percent.

18. The method according to claim 11, wherein the granules are compression molded by hydraulic pressing at a pressing force in a range from 0.1 to 10 kN.

19. The method according to claim 11, wherein the green body is sintered in a reducing atmosphere comprising hydrogen and an inert gas.

20. A method for producing radioisotopes wherein the sintered rare earth metal oxide target according to claim 1 is inserted in an instrumentation tube of a commercial nuclear power reactor and exposed to neutron flux when in energy producing operation.

21. The method according to claim 20 wherein the commercial nuclear power reactor comprises a system for generating radioisotopes in an operating nuclear reactor vessel comprising an irradiation target drive subsystem having means to produce a pressurized gaseous fluid that interacts with the sintered rare earth metal oxide target to drive the target from a target storage subsystem into the instrumentation tube, and from the instrumentation tube into a removal subsystem after irradiation.

22. The method according to claim 20 comprising inserting the sintered rare earth metal oxide target in an instrumentation tube extending into a reactor core by means of pressurized air and exposing the sintered targets to neutron flux encountered in the nuclear reactor when operating, for a predetermined period of time, so that the sintered target converts to a radioisotope, and removing the sintered target and produced radioisotope from the instrumentation tube.

23. The method according to claim 20 wherein the radioisotope is Lu-177.

* * * * *